(12) United States Patent
Yang

(10) Patent No.: US 6,574,184 B2
(45) Date of Patent: Jun. 3, 2003

(54) APPARATUS FOR CONTROLLING A MIRROR SIGNAL AND A METHOD THEREOF

(75) Inventor: Jak-heun Yang, Gyeonggi-do (KR)

(73) Assignee: Samsung Electrics Co. LTD, Suwon (KR)

( * ) Notice: Subject to any disclaimer, the term of this patent is extended or adjusted under 35 U.S.C. 154(b) by 0 days.

(21) Appl. No.: 09/986,455

(22) Filed: Nov. 8, 2001

(65) Prior Publication Data

US 2002/0141314 A1 Oct. 3, 2002

(30) Foreign Application Priority Data

Mar. 27, 2001 (KR) ........................................ 2001-16011

(51) Int. Cl.[7] .................................................. G11B 7/00
(52) U.S. Cl. ................................................. 369/124.01
(58) Field of Search ........................... 369/44.27, 44.28, 369/44.29, 44.32, 53.3, 53.34, 53.37, 124.01, 124.05, 124.15

(56) References Cited

U.S. PATENT DOCUMENTS 5,841,751 A * 11/1998 Komazaki et al. ...... 369/124.05
5,953,305 A * 9/1999 Jeong ........................... 327/552
6,104,680 A * 8/2000 Laufer et al. ............. 369/44.27
6,154,429 A * 11/2000 Grimm .................. 369/124.01

FOREIGN PATENT DOCUMENTS

JP          2001-16011         11/2002

* cited by examiner

Primary Examiner—Paul W. Huber
(74) Attorney, Agent, or Firm—Staas & Halsey LLP

(57) ABSTRACT

An optical disc player, and more particularly, an apparatus controlling a mirror signal independently of variations of the quantity of light in a laser received by a pickup or the reflectivity of a disc, and a method thereof. The apparatus includes an envelope detector detecting an envelope of a signal which is reflected from an optical disc, a center voltage outputting unit outputting a center voltage of the envelope, a comparator outputting the optimum mirror signal by comparing the envelope with the center voltage using a predetermined mirror controlling signal and a mirror signal controller outputting a predetermined mirror controlling signal to the comparator, until the mirror signal output from the comparator reaches a predetermined level compared to a fixed mirror signal. Further, a mirror signal output from the comparator is used as an offset signal for the subsequent mirror signal and thus a regular mirror signal can be output independently of variations of the quantity of light in a laser received by a pickup or the reflectivity of a disc. As a result, the mirror signal can be correctly incident on a target point when a track of a disc is jumped.

13 Claims, 7 Drawing Sheets

APPARATUS FOR CONTROLLING A MIRROR SIGNAL AND A METHOD THEREOF

CROSS-REFERENCE TO RELATED APPLICATIONS

This application claims the benefit of Korean Patent Application No. 2001-16011 filed on Mar. 27, 2001, in the Korean Industrial Property Office, the disclosure of which is incorporated herein by reference.

BACKGROUND OF THE INVENTION

1. Field of the Invention

The present invention relates to an optical disc player, and more particularly, to an apparatus controlling a mirror signal to be constantly output independently of variations of the quantity of light from a laser beam received by a pickup or the reflectivity of a disc, and a method thereof.

2. Description of the Related Art

Recorded information has been generally reproduced by means of a magnetic system or light. When using a magnetic system, an array of the polarity of a magnetic object applied to a magnetic medium is detected to reproduce information corresponding to the polarity (or phase). This method has an advantage in that it is easy to record and reproduce information because the array of the polarity of the magnetic object is used.

On the other hand, when using light, information is reproduced by scanning light on a recording surface of a disc and detecting irregular reflections caused by pits recorded on the disc. This method has an advantage in that information retaining efficiency is excellent because a pit is recorded on a recording medium.

When reproducing information by light, CD-ROMs and DVD-ROMs have been widely used for a storage medium. A general optical disc contains several sectors, which are sectioned in a radial pattern on a circular storage medium, and several tracks, which are equally divided in a concentric circle pattern. An optical disc usually rotates at a speed of 720 RPM and is played back in the form of a concentric circle from its center to its outer diameter by an optical disc player.

The above-described optical disc player includes an apparatus generating a mirror signal capable of correctly irradiating a beam in a pickup on a target point when a track of an optical disc is jumped, as shown in FIG. 1.

Referring to FIG. 1, a conventional apparatus that generates a mirror signal is composed of an ABCD summer 10, a first peak/bottom holder 11, a low pass filter (LPF) 12, a second peak/bottom holder 13 and a comparator 14.

As shown in FIGS. 3A and 3B, a tracking error signal and a mirror signal are output when a track of a disc is jumped. At that time, the mirror signal has a 90° phase difference with respect to the tracking error signal by which it is determined whether the mirror signal is stably incident on a target point by monitoring the mirror signal when a track of a disc is jumped.

Signals picked up by a photo diode, which is divided into four sections (not shown), are combined in the ABCD summer 10. A signal generated by the radio frequency (RF) ABCD summer 10 is received by the first peak/bottom holder 11 and is divided into two signals, a peak hold RF signal and a bottom hold RF signal, in the first peak/bottom holder 11. Thereafter, a difference between the divided two signals is calculated through the first peak/bottom holder 11. The calculated difference is low-pass filtered in the LPF 12 and, as a result, a radio frequency ripple (RFRP) signal is output. The second peak/bottom holder 13 receives the RFRP signal from the LPF 12 and outputs a center voltage of two signals passing through the peak holder and bottom holder, i.e., a radio frequency center (RFCT) signal. The comparator 14 compares the RFRP signal with the RFCT signal and outputs a final mirror signal. To output the final mirror signal, the comparator 14 receives a mirror-offset signal from an exterior source (not shown).

In the past, the mirror offset signal was fixedly used, and therefore, as shown in FIGS. 3C and 3D, a mirror signal was irregularly output depending on changes in the ABCD summer 10 according to variations of the quantity of light of laser received by a pickup and the reflectivity of a disc. That is, due to an irregular output of the mirror signal, it is difficult to determine whether the mirror signal is correctly incident on a target point when a track of a disc is jumped. Further, a mirror offset signal output depends on the type of disc, and therefore, it must be newly set up for each disc.

SUMMARY OF THE INVENTION

Accordingly, it is an object of the present invention to provide an apparatus controlling a mirror signal to be constantly output independently of variations of the quantity of light in a laser beam received by a pickup or the reflectivity of a disc.

Additional objects and advantages of the invention will be set forth in part in the description which follows and, in part, will be obvious from the description, or may be learned by practice of the invention.

The foregoing objects of the present invention are achieved by providing an apparatus controlling a mirror signal, including an envelope detector detecting an envelope of a signal which is reflected from an optical disc, a center voltage outputting unit outputting a center voltage of the envelope, a comparator outputting the optimum mirror signal by comparing the envelope with the center voltage using a predetermined mirror controlling signal, and a mirror signal controller outputting a predetermined mirror controlling signal to the comparator until the mirror signal output from the comparator reaches a predetermined level compared to a fixed mirror signal.

The above objects of the present invention may also be achieved by providing the mirror signal controller comprising an integrator integrating the mirror signal output from the comparator below a predetermined frequency band and a calculator checking a level of the integrated signal, continuously calculating the mirror controlling signal until the integrated signal reaches a predetermined level and outputting the calculated result to the comparator.

BRIEF DESCRIPTION OF THE DRAWINGS

These and other objects and advantages of the present invention will become apparent and more readily appreciated from the following description of the embodiments, taken in conjunction with the accompany drawings of which.

DETAILED DESCRIPTION OF THE PREFERRED EMBODIMENTS

Figure 1:
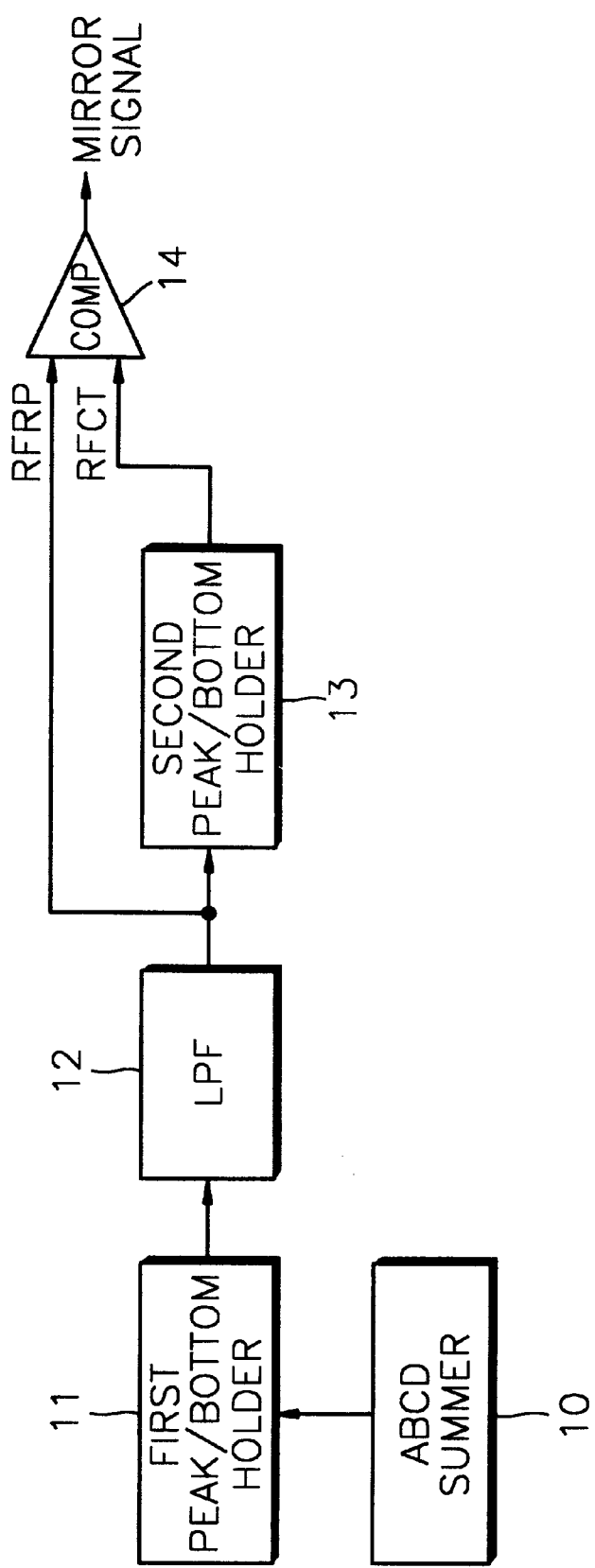
FIG. 1 is a block diagram illustrating the construction of a conventional apparatus controlling a mirror signal.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Hereinafter, the present invention will be described in detail by explaining an embodiment of the present invention with reference to the attached drawings. Like reference numerals in the drawings denote the same members.

Figure 2:
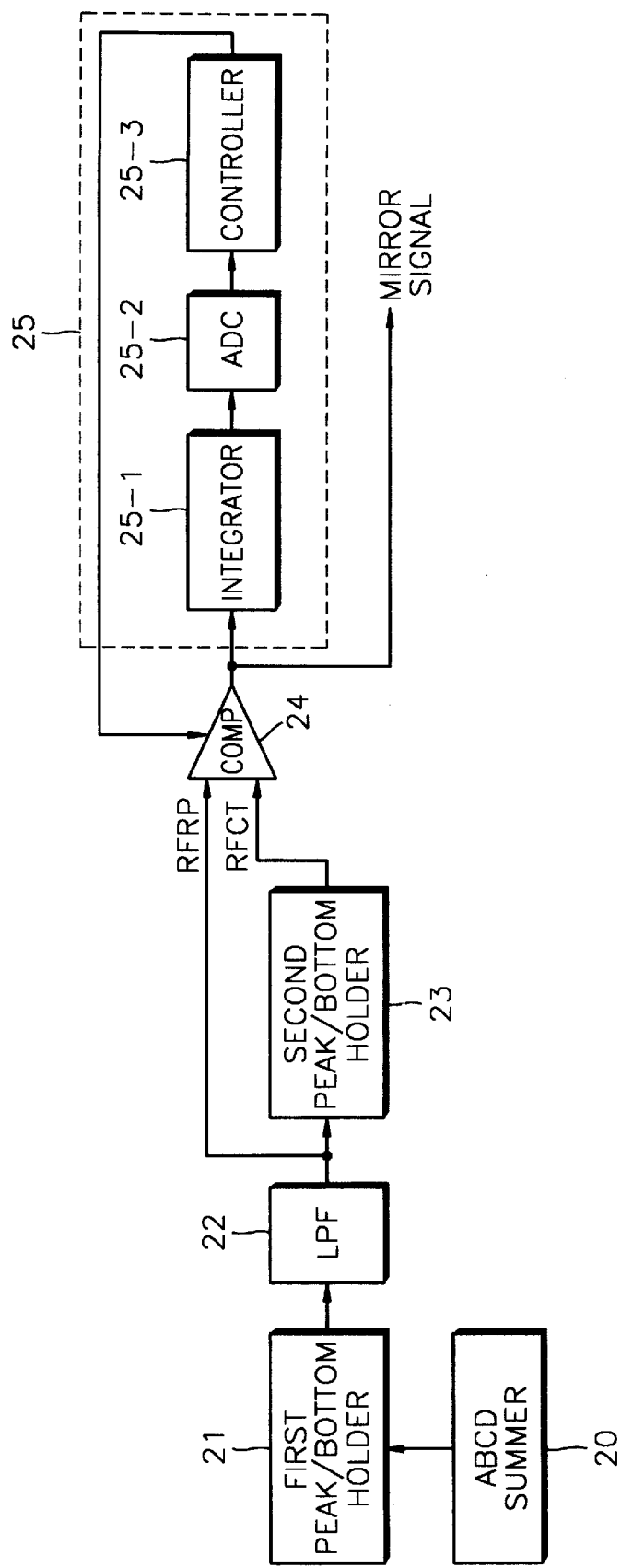
FIG. 2 is a block diagram illustrating the construction of an apparatus controlling a mirror signal according to the present invention.

FIG. 2 is a block diagram illustrating the construction of an apparatus controlling a mirror signal according to the present invention. Referring to FIG. 2, the apparatus comprises an ABCD summer 20, a first peak/bottom holder 21, a LPF 22, a second peak/bottom holder 23, a comparator 24 and a mirror signal controller 25. The mirror signal controller 25 comprises an integrator 25-1, an A/D converter (ADC) 25-2 and a controller 25-3. According to an embodiment of the present invention, the first peak/bottom holder 21, the second peak/bottom holder 23 and the controller 25-3 can be described as an envelope detector, a center voltage output unit and a calculator, respectively.

Figure 3A:
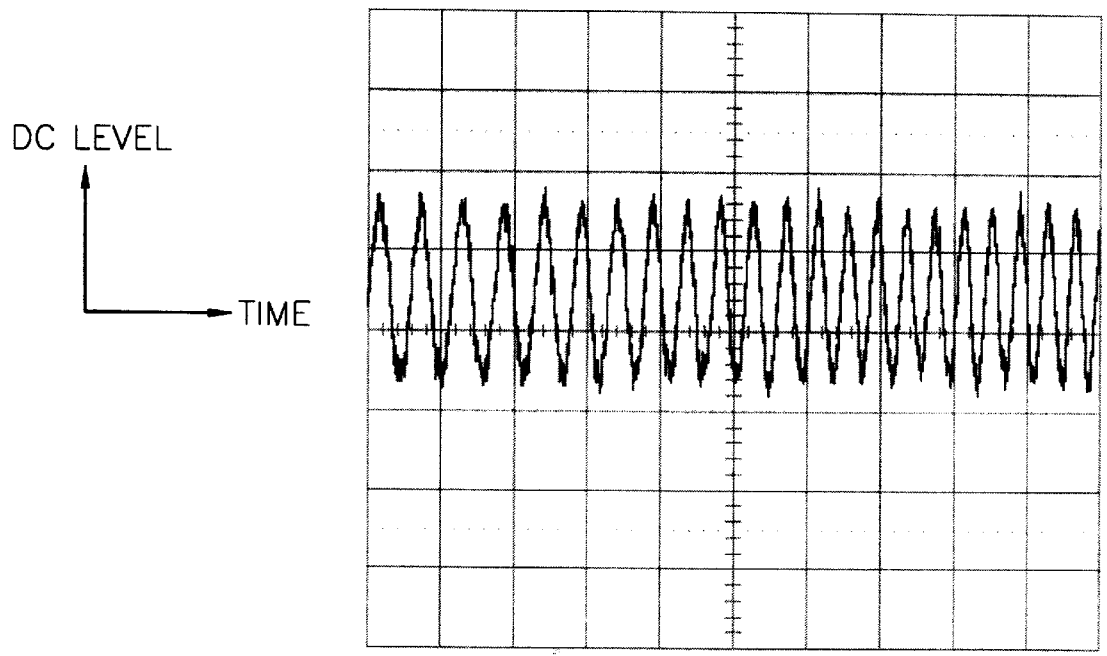
FIGS. 3A through 3D are waveform diagrams obtained from the apparatuses shown in FIG. 1.
Figure 3B:
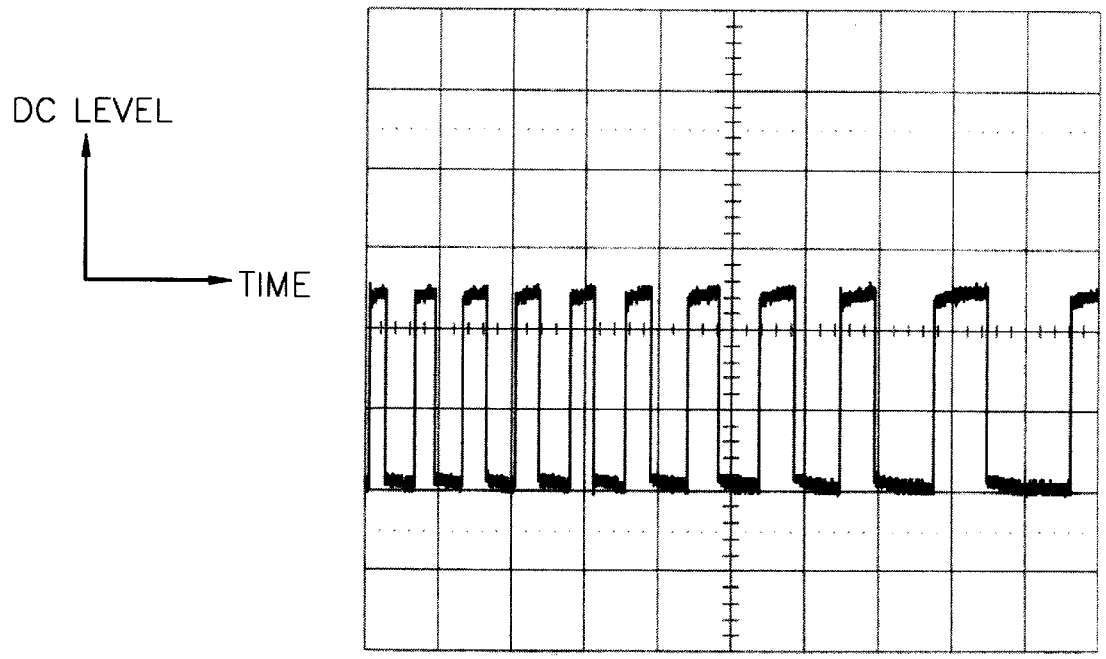
Figure 3C:
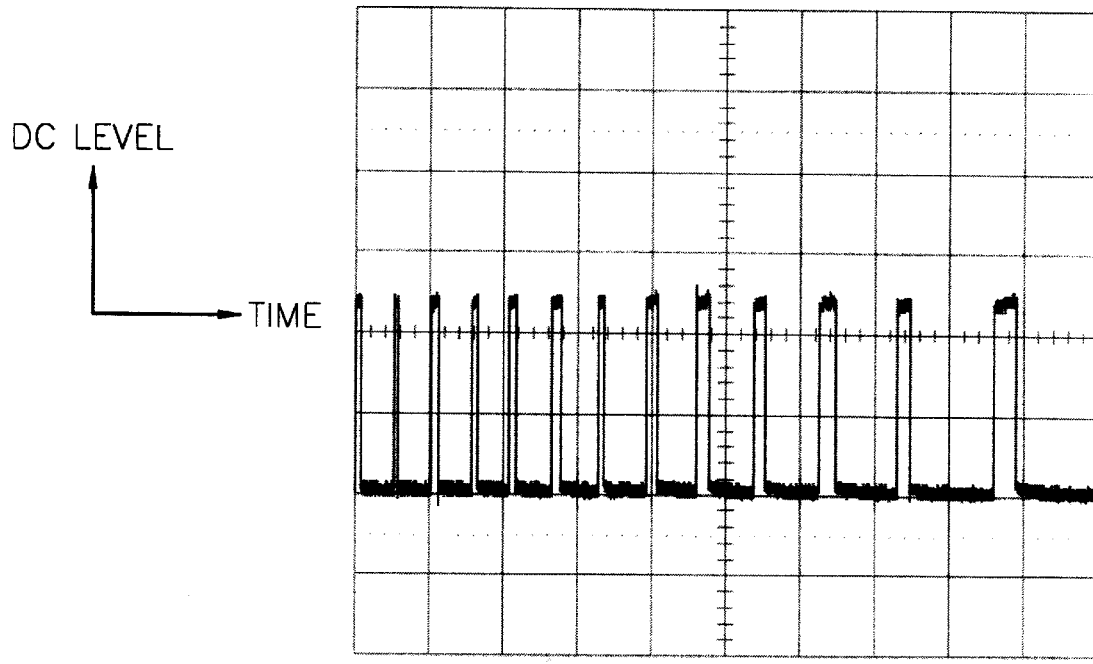
Figure 3D:
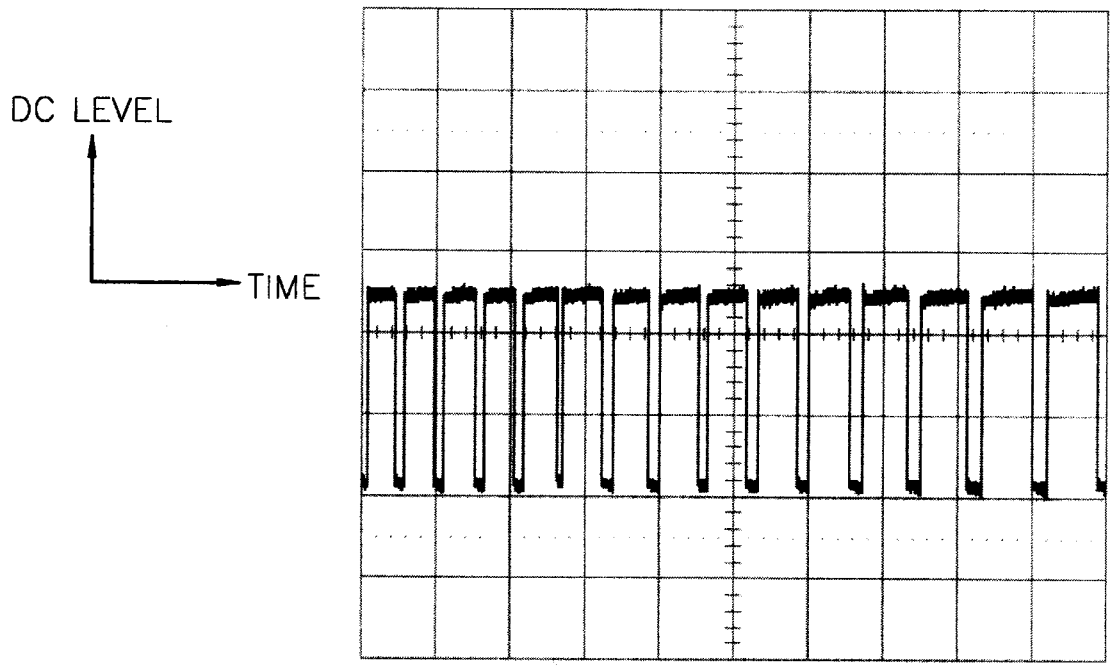

A tracking error signal and a stable mirror signal generated when a track of a disc is jumped, are illustrated in FIGS. 3A and 3B. In accordance with changes in the ABCD summer 20 according to variations of the quantity of light in a laser received by a pickup and the reflectivity of a disc, a mirror signal is irregularly output as shown in the 'mirror under' occurrence (refer to FIG. 3C) and 'mirror over' occurrence (refer to FIG. 3D). As a result, it is difficult to determine whether the mirror signal is correctly incident on a target point when a track of a disc is jumped. Thus, in order to control and output an optimum mirror signal, the present invention further comprises the mirror signal controller 25.

Figure 3E:
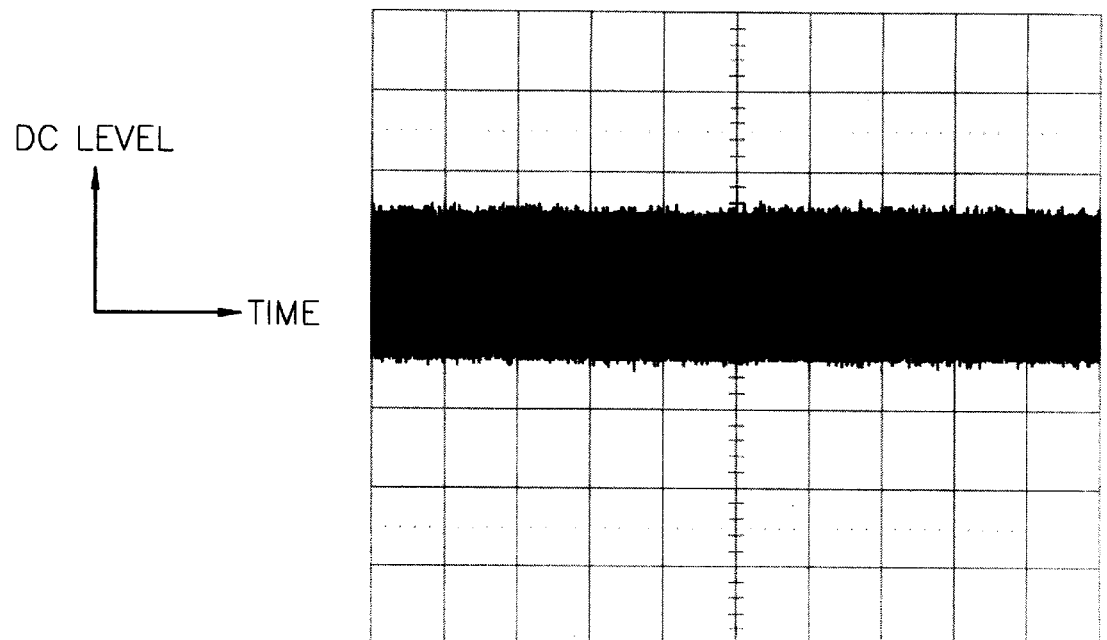
FIGS. 3E through 3J are integrated waveform diagrams obtained from the apparatus shown in FIG. 2.
Figure 3F:
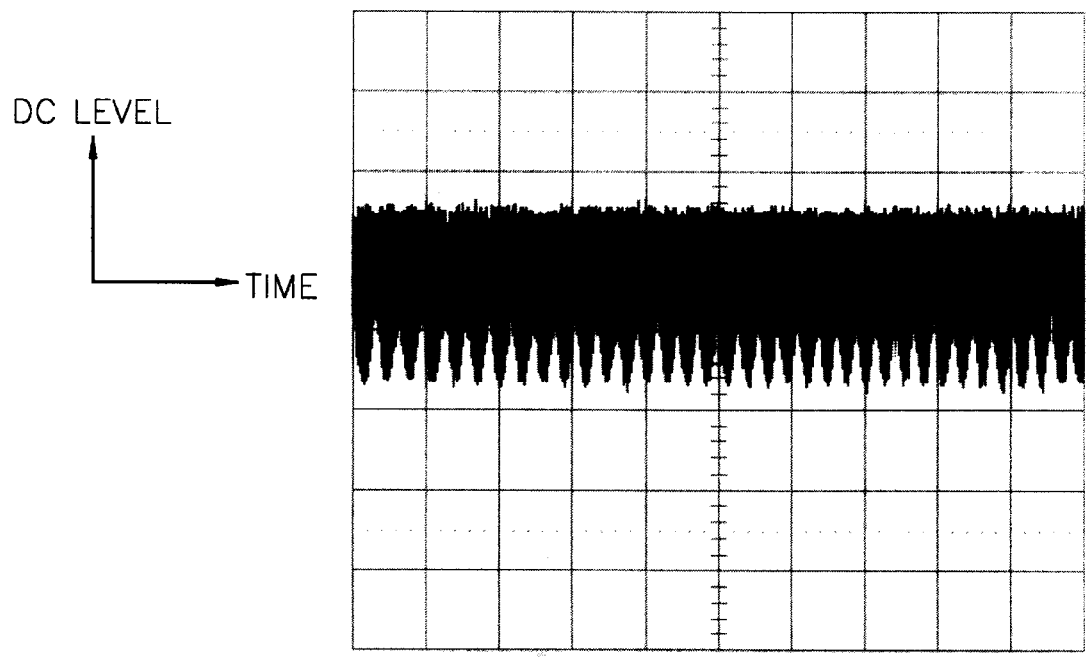

The ABCD summer 20 combines signals picked up by a photo diode, which is divided into four sections (not shown). A signal output from the ABCD summer 20 under a normal condition is illustrated in FIG. 3E and a signal output from the ABCD summer 20, when a track of a disc is jumped, i.e., searching a track, is illustrated in FIG. 3F.

Figure 3G:
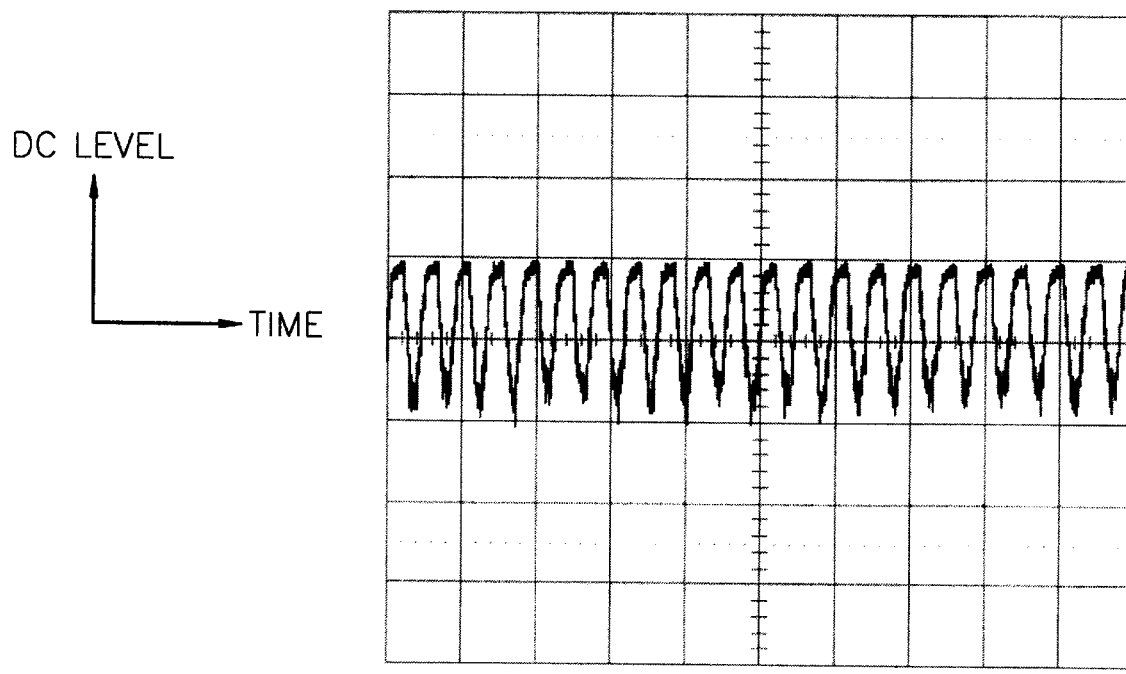
Figure 3H:
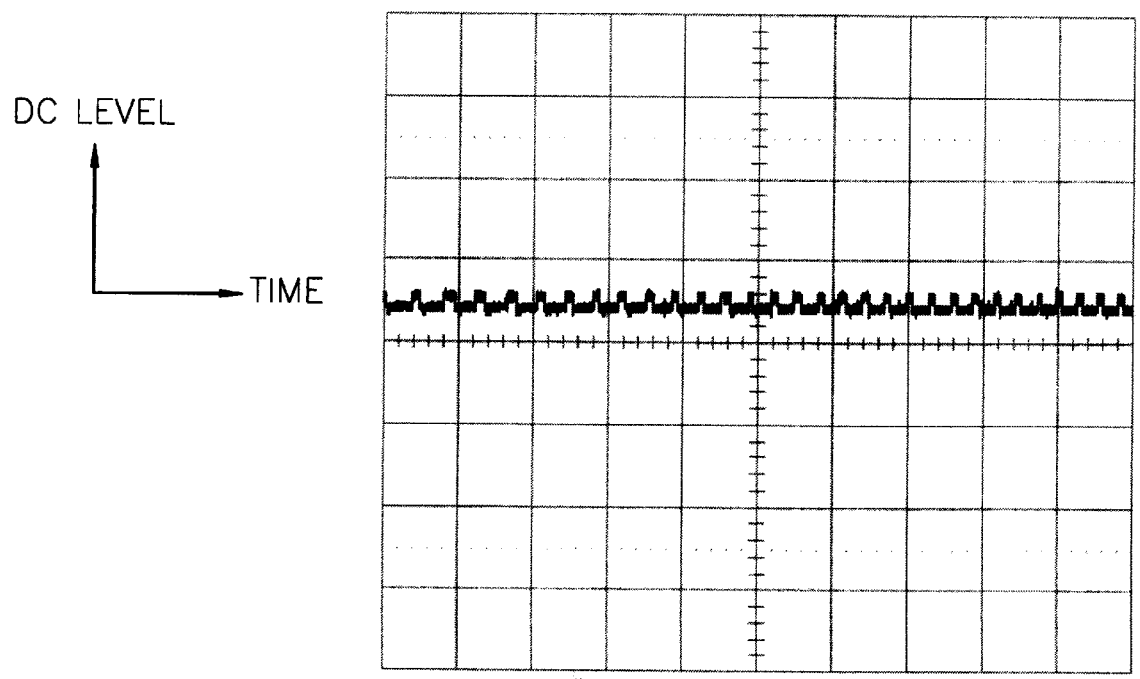

The first peak/bottom holder 21 receives a radio frequency (RF) signal (refer to FIG. 3F) output from the ABCD summer 20 when a track of a disc is jumped and then calculates a difference between two signals passing through the first peak holder and first bottom holder. The two signals are a peak envelope and a bottom envelope of the RF signal from the ABCD summer 20. That is, the first peak/bottom holder 21 detects the peak and the bottom envelopes of the RF signal generated in the ABCD summer 20 when a track of a disc is jumped. The difference between the two signals in the first peak/bottom holder 21 is filtered in the LPF 22, which includes resistors and capacitors, and is output as a radio frequency ripple (RFRP) signal. The RFRP signal, which is an output of the LPF 22, is illustrated in FIG. 3G.

The RFRP signal output from the LPF 22 is received by and divided into two signals in the second peak/bottom holder 23. A center voltage of the divided two signals, i.e., radio frequency center (RFCT), is output from the second peak/bottom holder 23. The RFCT signal, which is an output signal of the second peak/bottom holder 23, is illustrated in FIG. 3F.

The comparator 24 compares the RFRP signal with the RFCT signal and outputs a mirror signal. To output the final mirror signal, the comparator 24 receives a mirror-offset signal from the mirror signal controller 25. Thereafter, the comparator 24 compensates for a DC offset contained in the output of the second peak/bottom holder 23 by the mirror-offset signal output from the mirror signal controller 25 and outputs a compensated mirror signal.

Figure 3I:
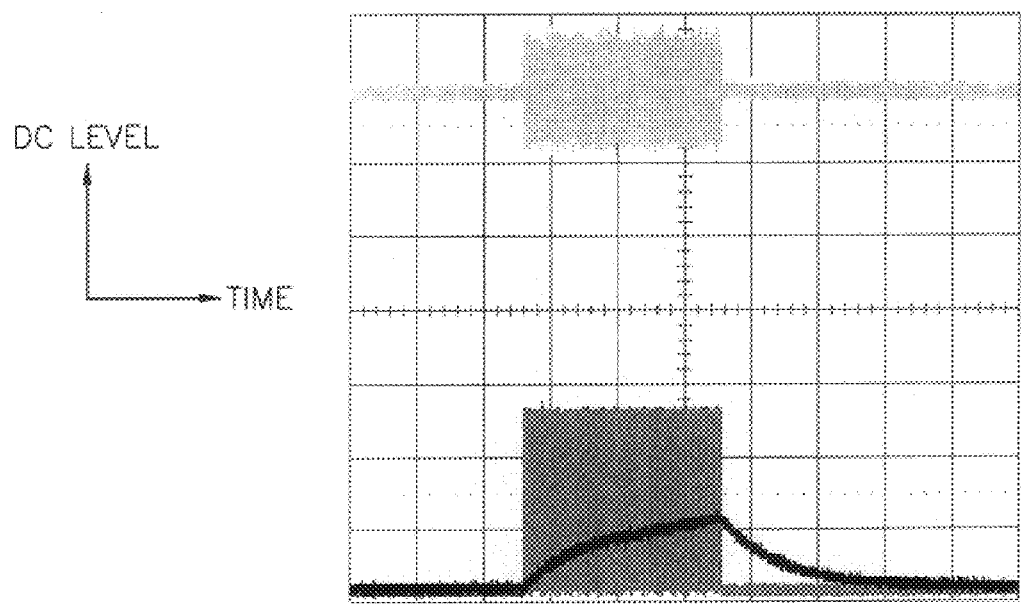
Figure 3J:
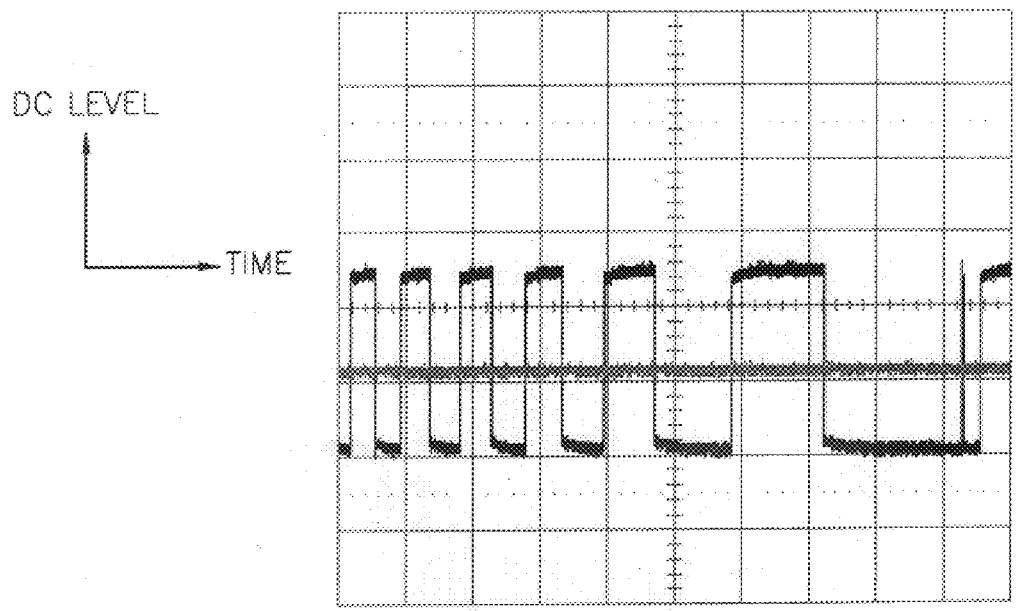

The integrator 25-1, which is included in the mirror signal controller 25 and outputs a predetermined mirror-controlling signal, integrates the mirror signal output from the comparator 24 below a regular frequency band. A mirror signal to be integrated when a track of a disc is jumped is illustrated in the upper portion of FIG. 3I, and an integrated signal shown in FIG. 3J is magnified and illustrated in the lower portion of FIG. 3I.

The ADC 25-2 converts the integrated mirror signal into a digital integrated mirror signal.

The controller 25-3 checks a DC level of a digital mirror signal output from the ADC 25-2 and controls and outputs a controlled mirror offset to the comparator 24 until the digital mirror signal reaches a fixed DC level. An offset value, according to variations in the quantity of light in the laser beam received by a pickup, and/or the reflectivity of a disc or the type of a disc, is stored in the controller 25-3. The controller (25-3) compares the digital mirror signal output from ADC (25-2) with the offset value stored in the controller (25-3) and controls the duty ratio of the final mirror to be output from COMP (24) to be around 50%.

As described above, according to the present invention, a mirror signal output from the comparator is used as an offset signal for the subsequent mirror signal and thus a regular mirror signal can be output independently of variations of the quantity of light in laser received by a pickup or the reflectivity of a disc. As a result, the mirror signal can be correctly incident on a target point when a track of a disc is jumped.

Although a few embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. An apparatus to control a mirror signal for an optical disc, comprising:

an envelope detector detecting an envelope of a signal which is reflected from the optical disc;

a center voltage outputting unit outputting a center voltage of the envelope;

a comparator outputting the mirror signal by comparing the envelope with the center voltage using a predetermined mirror controlling signal; and a mirror signal controller outputting a mirror controlling signal to the comparator, until the mirror signal output from the comparator reaches a predetermined level compared to a fixed mirror signal.

2. The apparatus as claimed in claim 1, wherein the mirror signal controller comprises:

an integrator integrating the mirror signal output from the comparator below a predetermined frequency band; and a calculator checking a level of the integrated signal, continuously calculating the mirror controlling signal until the integrated signal reaches the predetermined level and outputting the mirror controlling signal to the comparator.

3. The apparatus according to claim 2, wherein the envelope is a radio frequency ripple (RFRP) signal and the center voltage is a radio frequency center (RFCT) signal.

4. The apparatus according to claim 3, wherein the comparator compensates for a DC offset contained in said center voltage by said mirror controlling signal output from said mirror signal controller to output the mirror signal.

5. The apparatus according to claim 4, wherein the integrator integrates said mirror signal output from the comparator below a regular frequency band to output a mirror-controlling signal.

6. The apparatus according to claim 5, wherein said calculator converts said integrated mirror signal into a digital integrated mirror signal, checks a DC level of the digital integrated mirror signal and controls and outputs the mirror controlling signal to the comparator until the digital integrated mirror signal reaches a fixed DC level.

7. The apparatus according to claim 1, wherein the mirror signal finally reaches a state having a duty ratio which is approximately 50% of the mirror controlling signal.

8. An apparatus to control a mirror signal for an optical disc in an optical drive system which uses a pickup having a light source to emit a light onto the optical disc and the signal reflected from the optical disc being received by the pickup, the apparatus comprising:

an envelope detector detecting an envelope of a signal which is reflected from the optical disc;

a center voltage outputting unit outputting a center voltage of the envelope;

a comparator outputting the mirror signal by comparing the envelope with the center voltage using a mirror controlling signal; and a mirror signal controller generating the mirror controlling signal independent of variations in a quantity of the reflected signal received by the pickup and a reflectivity of the optical disc.

9. The apparatus according to claim 8, wherein the mirror signal controller generates the mirror controlling signal based upon the mirror signal.

10. The apparatus according to claim 9, wherein the mirror signal controller comprises:

an integrator integrating the mirror signal output from the comparator below a predetermined frequency band; and a calculator checking a level of the integrated signal, continuously calculating the mirror controlling signal until the integrated signal reaches a predetermined level and outputting the calculated result to the comparator as the mirror controlling signal.

11. The apparatus according to claim 10, further comprising:

an analog to digital converter which integrated mirror signal to a digital integrated mirror signal;

wherein the calculator checks a DC level of the digital integrated mirror signal and controls and outputs the mirror controlling signal until the digital integrated mirror signal reaches a fixed DC level.

12. A method of controlling a mirror signal comprising:

detecting an envelope of a signal reflected from an optical disc;

outputting a center voltage of said envelope;

comparing said envelope with the center voltage using a predetermined mirror controlling signal to obtain a mirror signal;

outputting said mirror signal; and determining said predetermined mirror controlling signal based upon said mirror signal and providing said predetermined mirror controlling signal to the comparing operation until the mirror signal reaches a predetermined level compared to a fixed mirror signal.

13. The method according to claim 12, wherein the providing operation comprises:

integrating the mirror signal output below a predetermined frequency band;

checking a level of the integrated signal;

continuously calculating the mirror controlling signal until the integrated signal reaches a predetermined level; and outputting the calculated result to the comparing operation.

* * * * *